Patented Mar. 12, 1940

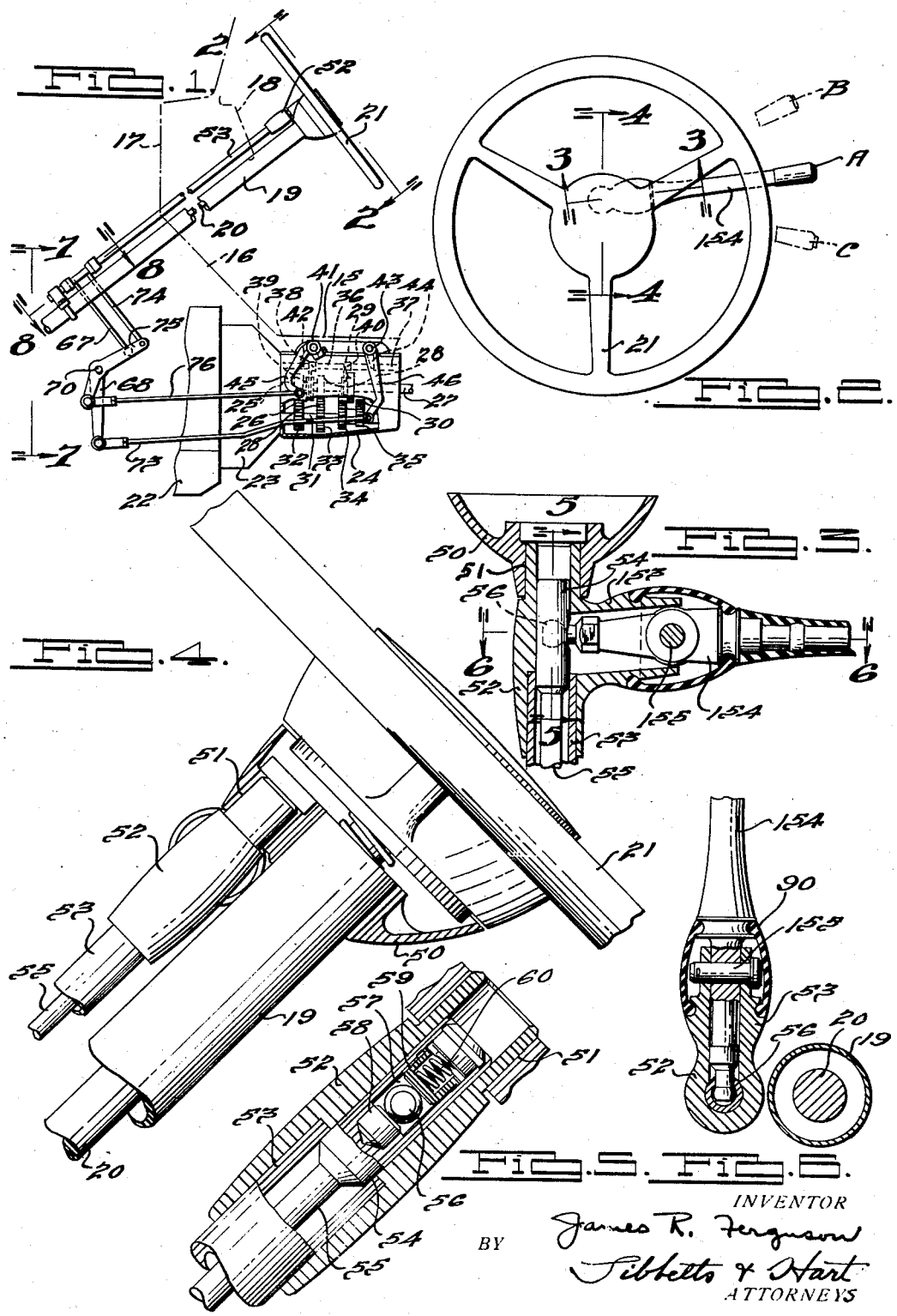

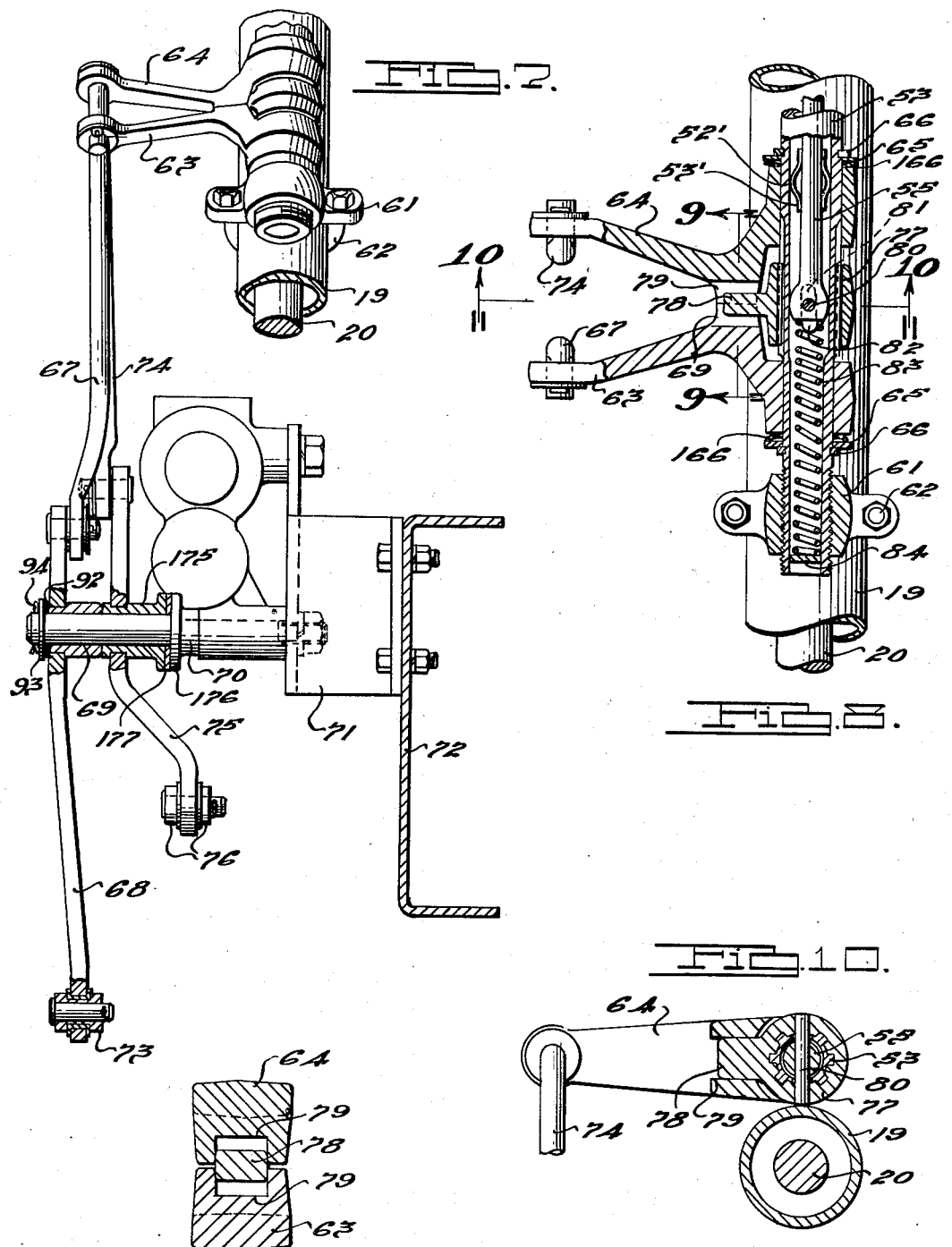

2,193,230

UNITED STATES PATENT OFFICE 2,193,230

TRANSMISSION CONTROL MECHANISM

James R. Ferguson, Royal Oak, Mich., assignor to Packard Motor Car Company, Detroit, Mich., a corporation of Michigan Application June 24, 1938, Serial No. 215,569

7 Claims. (Cl. 74—473)

This invention relates to motor vehicles and more particularly to remote control mechanism for the change speed drive gearing.

An object of the invention is to provide manually operable mechanism for selecting the driving speed relation of a motor vehicle gearing that can be arranged in a vehicle body without interfering with the comfort of passengers.

Another object of the invention is to provide control mechanism for motor vehicle drive gearing that can be quickly and accurately assembled into desired relationship.

Another object of the invention is to provide remote control mechanism for drive gearing of a motor vehicle that can be conveniently and readily operated by the driver.

Other objects of the invention will appear from the following description taken in connection with the drawings, which form a part of this specification, and in which:

Fig. 1 is a diagrammatic view of a portion of a motor vehicle showing the general arrangement of the shift control mechanism associated with a conventional form of change speed drive gearing;

Fig. 2 is a plan view of the device taken on line 2—2 of Fig. 1;

Fig. 3 is a vertical sectional view of the upper end of the control mechanism taken on line 3—3 of Fig. 2;

Fig. 4 is another sectional view of the device taken on line 4—4 of Fig. 2;

Fig. 5 is a sectional view taken on line 5—5 of Fig. 3;

Fig. 6 is another sectional view taken on line 6—6 of Fig. 3;

Fig. 7 is a vertical elevational view of the device taken on line 7—7 of Fig. 1;

Fig. 8 is a sectional view taken on line 8—8 of Fig. 1;

Fig. 9 is a sectional view taken on line 9—9 of Fig. 8;

Fig. 10 is a sectional view taken on line 10—10 of Fig. 8.

Referring now to Fig. 1 of the drawings, the forward end of a motor vehicle body is shown in dotted lines, the floor board being indicated at 15, the toe board at 16, the dash at 17 and the instrument board at 18. The conventional steering column 19 extends through the toe board and carries therein the steering shaft 20 adapted to be rotated by the hand wheel 21.

Beneath the forward end of the body is arranged a power unit of conventional design, such unit including the engine 22, the fly wheel and clutch housing 23, and the change speed gear casing 24. A drive shaft 25 extends into the forward end of the gear casing and has fixed thereon a driving gear 26. A driven shaft 27 aligns with the drive shaft and has a gear 28 loosely mounted thereon. There is also a gear 29 slidably splined upon shaft 27 and there is also the usual idler 30 mounted in the gear casing. Lay shaft 31 carries gear 32 meshing with gear 26, gear 33 meshing with gear 28, and gears 34 and 35. The gear 35 meshes with the idler 30 and the gear 29 is shiftable into driving relation with either the gear 34 or the idler 30. In the upper portion of the casing is arranged a pair of rails 36 and 37, the rail 36 carrying a yoke 38 for engaging a clutch 39 that is slidably splined upon shaft 27 intermediate the gears 26 and 28. This clutch is arranged to be moved into positive driving engagement with either of such gears. Carried by the rail 37 is a yoke 40 that engages a portion of the gear 29 to move the same upon the shaft 27 for engagement with the gear 34 or the idler 30.

When the clutch 39 is moved into engagement with the gear 26 then the drive will be directly from the driving shaft 25 to the driven shaft 27, this being the highest forward speed obtainable. When the clutch 39 is moved into engagement with the gear 28 then the drive will be from the driving shaft through gears 26, 32 and 33 to gear 28 and through the clutch to the driven shaft 27, such drive providing second forward speed. When the clutch 39 is disengaged and the gear 29 is shifted into engagement with the gear 34 then the drive will be from the driving shaft through gears 26 and 32 to the lay shaft 31 and through gear 34 and 29 to shaft 27, such drive providing low forward speed. When the gear 29 is moved into engagement with the idler 30 then the drive is from the driving shaft through gears 26 and 32 to the lay shaft and through gear 35, idler 30 and gear 29 to the driven shaft 27, such connections providing a reverse drive.

A shaft 41 extends through one wall of the gear casing and carries on its inner end a shifter element 42 engaging with the rail 36, and another shaft 43 extends into the same wall of the casing and carries on its inner end an element 44 that engages the rail 37 to shift the same. On the outer end of shaft 41 is an arm 45 and on the outer end of shaft 43 is an arm 46. These arms, shafts and rail connections together with the yokes associated with the rails provide two mechanisms for controlling the driving relation of the gearing.

Associated with the conventional mechanism so far described is provided actuator mechanism extending into the body closely adjacent the steering column and wheel. On the upper end of the steering column is mounted a casing 50 having an opening 51 into which one end of an annular hollow mounting member 52 extends. This mounting member 52 is arranged to carry in its lower end one end of a tube 53 and to carry in its upper end the enlarged end 54 of an axially slidable rod 55, the rod, with the exception of its enlarged upper end, being contained entirely within the tube 53 and held in spaced relation therewith by spring fingers 52' of a member 53' on the rod. The tube 53 is fixed to the mounting member 52 and the mounting member is arranged to rotate in its bearing in the casing 50 which is fixed to the steering column 19.

The mounting 52 has a laterally extending hollow portion 153 through which lever 154 extends and is journaled thereto by pin 155. The inner end 56 of this lever extends into the hollow 57 of the enlarged end 54 of the rod and engages with bearings therein. One of the bearings 58 is fixed and the other bearing 59 is arranged for slight axial movement and has associated therewith a coil spring 60. Vertical movement of the lever 154 on its pivot 155 will move the rod axially, and arcuate movement of the lever 154 in a lateral direction will, through the pin 155, carry the mounting 52 therewith to thereby move the tube 53 about its axis.

The lower end of the tube 53 is carried by a bearing 61 held in fixed relation on the steering column 19 by a U-bolt 62. This bearing 61 is threaded internally and the lower end of the tube is threaded and is screwed into the bearing, this arrangement positioning the tube with the steering column and preventing axial movement thereof by forces developed when moving the rod 55 axially. A pair of arms 63 and 64 have hub portions rotatably mounted on the lower end of the tube 53 above the bearing 61, and such hubs are located axially on the tube by disk washers 65 and split spring rings 66, the spring washers engaging in annular recesses formed in the tube. Between the washers and the hubs of arms 63 and 64 are arranged spring disks 166.

Linkage connects the arm 63 with the arm 46 and another linkage connects the arm 64 with the arm 45. Attached to the arm 63 is a link member 67 that is connected with bell crank 68, such crank being fixed on sleeve 69 mounted on stub shaft 70 fixed to a bracket 71 mounted on a side sill 72 of the vehicle main frame. A link 73 connects the lower end of the arm 46 to bell crank 68. To the arm 64 is attached a link 74 that connects with the bell crank 75 and connecting this bell crank and the arm 45 is a link 76. The bell crank 75 is fixed on hub 175 mounted on the shaft 70 and between this hub and a flange 176 on the shaft is arranged a fibre disk washer 177. The hubs 69 and 175 are held on the shaft by washer 93 and cotter pin 94, and a spring washer 92 is arranged between hub 69 and the washer holding the hubs in abutting relation and the hub 175 in frictional engagement with the washer 177.

Slidably splined on the tube 53 is a selector hub 77 having a selector finger 78 projecting therefrom that is adapted to engage in a driving relation with recesses 79 in the adjacent faces of the arms 63 and 64. When these recesses are adjacent each other axial movement of the hub 77 will move the finger into engagement with one or the other of the recesses so that when the tube 53 is rotated then it will drivingly engage and rotate the arm with which it is associated and will have no effect upon the other arm.

The selector means is fixed to the rod 55 in tube 53 by means of a connecting pin 80. This pin extends through oppositely disposed slots 81 formed in the tube to permit the pin to be moved axially with the rod 55 relative to the tube 53. The extreme lower end of the rod 55 is formed with a boss 82 that serves to locate one end of coil spring 83 having its other end seated against a closure member 84 in the bottom portion of the tube 53. The purpose of this spring 83 is to normally urge the rod 55 into its uppermost position whereby the selector element 78 will be in driving engagement with the arm 64, thus drivingly connecting the mechanism so that clutch 39 will be actuated upon arcuate movement of the manually operable lever 54 in a lateral direction, and this relationship will be maintained until the lever 54 is rocked forwardly upon its pivot 55 to move the shaft 53 downwardly to a position where the selector 78 will drivingly engage in the recess 79 in arm 63 whereupon arcuate movement of the lever in a lateral direction will rotate the tube 53 and actuate the linkage connecting the arm 63 with the arm 46.

When the lever 154 is in its central arcuate position, as indicated in full lines at A in Fig. 2, and is released manually, it will be in or moved to its rearmost position by spring 83 and the selector will drivingly engage arm 64. With the lever in such rearmost position movement of the lever to the left into the dotted position, shown at B in Fig. 2, the arm 64 will be rocked to move the clutch 39 forwardly into engagement with gear 28 to establish second speed drive through the gearing. When the lever 54 is in rearmost position and is moved to the right, as shown in dotted lines at C in Fig. 2, then the arm 64 through the linkage connected with the arm 38 will shift the clutch 39 into engagement with the gear 26 to provide a second speed drive between the driving shaft and the driven shaft. When first speed forward is desired, the lever 54 must be moved forwardly against pressure of spring 83 until the selector 78 drivingly engages the arm 63 and then by moving the lever 54 to the dotted position shown at C in Fig. 2, the gear 29 will be shifted into engagement with the gear 34, the clutch 39 under such circumstances being in neutral position. When reverse drive is desired, the selector 78 is moved to drivingly engage the arm 63 and the lever is then moved in an arcuate direction to the left to the position shown at B in Fig. 2, whereupon the arm 46 will be rocked to move the gear 29 into engagement with the idler 30.

The mounting for the lower end of the tube 53 serves to properly locate and adjust the tube so that the slot 81 will be in desired relation with the pin 80 for the proper functioning of the selector 78 with respect to the arms 63 and 64. Surrounding the junction of the arm 154 with the mounting extension 153 is a rubber boot 90 that serves to exclude dirt and other foreign materials.

The mechanism herein described is such that the selection and shifting of the shift rods can be readily obtained manually by little effort upon the part of the driver through means of a lever that is close to his hands on the steering wheel so that only a very small movement of his hand away from the steering wheel has to be made, thus promoting greater safety in driving. The change speed control mechanism extends generally in front of the steering post and it will not interfere in any way with the space for occupants of the body.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a change speed gearing mechanism for motor vehicles, a pair of shift rails, a pair of shift mechanisms connected one to each rail, a rotatably mounted slotted tube, a rod axially movable in the tube, a selector slidably splined on said tube, means fixing the selector to the lower end of the rod and projecting through the slot in the tube, a pair of arms in spaced relation axially of and rotatably mounted on the outside of the tube and connected one with each shift mechanism, said arms having means thereon adapted to be drivingly engaged by the selector, and a lever pivoted on the upper end of the tube connected to said rod to move it axially to drivingly engage the selector with either one of the arms, said lever being shiftable in a direction to move said tube about its axis to actuate the shift mechanism connected to the selected arm.

2. Control means for a pair of shiftable gear changing mechanisms comprising a manually rotatable slotted tube, a rod in the tube mounted for axial movement, a selector slidably keyed on the tube, means extending through the tube slot fixing the selector to the rod, a pair of arms rotatably mounted on the tube and selectively engageable by said selector, said arms being connected one with each of the shiftable mechanisms, said selector establishing a driving connection between said tube and the engaged arm, and spring means effective to normally hold the selector in engagement with one of said arms.

3. Control means for a pair of shiftable gear changing mechanisms comprising a slotted tube mounted for movement in a rotational direction, a rod in the tube movable in an axial direction, a selector splined on the tube and movable in an axial direction thereon, a pair of arms connected with the shiftable mechanisms, said arms being swingably mounted on the tube one on each side of the selector and each adapted to be drivingly engaged by the selector, and a pin extending through the slots in the tube fixing the selector to the rod.

4. In a remote control gear shift mechanism, a manually rotatable tube, a pair of actuator arms rotatably mounted on said tube, means fixing said arms in an axial direction on said tube, a selector slidably splined on the tube between the arms and movable axially of the tube to drivingly engage either arm, a rod in the tube manually shiftable in an axial direction, and means fixing the selector to the rod.

5. In a remote control gear shift mechanism, a manually rotatable tube, a pair of actuator arms rotatably mounted on said tube, a selector having a hub slidably splined on said tube between the arms, said selector being engageable with said arms to selectively establish a driving relation with the tube, a manually operable rod in the tube mounted for axial movement, a connection fixing the rod with the selector, and a coil spring mounted in the tube and engaging the rod to normally maintain it in one extreme position of axial movement and thereby engage the selector in driving relation with one of the arms.

6. In a change speed gearing for motor vehicles having a pair of shift mechanisms, control means for said shift mechanisms comprising a tube, a rod extending concentrically with and in the tube, vibration damping means between the rod and the tube, a manually operable lever for turning said tube about its axis and for shifting said rod in an axial direction, a pair of arms swingable to actuate said mechanisms, and means fixed to the rod and connected with the tube for selecting and actuating said arms.

7. In a change speed gearing for motor vehicles having a pair of shift mechanisms, control means for said shift mechanisms comprising a tube movable in a direction about its axis, fixed bearings for said tube, one of said bearings having a threaded engagement with said tube, a pair of arms rotatably mounted on said tube and fixed thereon in an axial direction, and selector means carried by said tube having a portion extending between and selectively engageable in a driving relation with said arms, said selector means being movable axially of the tube to engage the arms, said screw bearing holding said tube from axial movement by forces developed in shifting the rod axially.

JAMES R. FERGUSON.